United States Patent
Kim et al.

(10) Patent No.: US 12,255,350 B2
(45) Date of Patent: Mar. 18, 2025

(54) COMPOSITION FOR COATING SEPARATOR, METHOD FOR MANUFACTURING SEPARATOR BY USING SAME, SEPARATOR, AND LITHIUM BATTERY EMPLOYING SAME

(71) Applicant: SAMSUNG SDI CO., LTD., Yongin-si (KR)

(72) Inventors: Hana Kim, Yongin-si (KR); Byungmin Lee, Yongin-si (KR); Minho Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/013,583

(22) PCT Filed: Feb. 22, 2022

(86) PCT No.: PCT/KR2022/002587
§ 371 (c)(1),
(2) Date: Feb. 8, 2023

(87) PCT Pub. No.: WO2022/186537
PCT Pub. Date: Sep. 9, 2022

(65) Prior Publication Data
US 2024/0243434 A1    Jul. 18, 2024

(30) Foreign Application Priority Data
Mar. 4, 2021  (KR) .................. 10-2021-0028899

(51) Int. Cl.
*H01M 50/446* (2021.01)
*H01M 50/403* (2021.01)
(Continued)

(52) U.S. Cl.
CPC ....... *H01M 50/446* (2021.01); *H01M 50/403* (2021.01); *H01M 50/42* (2021.01); *H01M 50/443* (2021.01)

(58) Field of Classification Search
CPC .. H01M 40/403; H01M 40/409; H01M 40/42; H01M 40/446
See application file for complete search history.

(56) References Cited

U.S. PATENT DOCUMENTS

| 6,306,545 B1 | 10/2001 | Carlson et al. |
| 2010/0316903 A1 | 12/2010 | Kim et al. |

(Continued)

FOREIGN PATENT DOCUMENTS

| JP | 4426721 B2 | 12/2009 |
| JP | 6068573 B2 | 1/2017 |

(Continued)

*Primary Examiner* — Amanda C. Walke
(74) *Attorney, Agent, or Firm* — Lee IP Law, P.C.

(57) ABSTRACT

Provided are a composition for coating a separator, a method of preparing a separator by using the same, a separator, and a lithium battery employing the separator. The composition for coating a separator includes: a polyacrylamide-based copolymer including a cross-linking reactive group; inorganic particles; and water, and the cross-linking reactive group includes at least two functional groups cross-linkable with each other. The composition for coating a separator may be used as a one-component type without a crosslinker, and a separator having high thermal resistance characteristics may be prepared by using the composition.

16 Claims, 2 Drawing Sheets

(51) Int. Cl.
*H01M 50/42*      (2021.01)
*H01M 50/443*     (2021.01)

(56) References Cited

U.S. PATENT DOCUMENTS

| | | | |
|---|---|---|---|
| 2014/0050965 A1* | 2/2014 | Ha | H01M 50/403 |
| | | | 429/144 |
| 2018/0026270 A1 | 1/2018 | Bae et al. | |
| 2018/0111158 A1* | 4/2018 | Tanikawa | B01D 67/00791 |
| 2018/0366709 A1* | 12/2018 | Mizuno | H01M 50/491 |
| 2019/0044118 A1 | 2/2019 | Sakurai et al. | |
| 2019/0067699 A1 | 2/2019 | Bae et al. | |
| 2019/0237732 A1 | 8/2019 | Hu et al. | |
| 2020/0006733 A1* | 1/2020 | Cho | H01M 50/489 |
| 2020/0152985 A1 | 5/2020 | Yamamoto et al. | |
| 2022/0029244 A1 | 1/2022 | Kim et al. | |
| 2024/0145866 A1* | 5/2024 | Kim | H01M 50/489 |

FOREIGN PATENT DOCUMENTS

| | | | | | |
|---|---|---|---|---|---|
| JP | 2019-029313 | A | | 2/2019 | |
| JP | 2019-525439 | A | | 9/2019 | |
| KR | 10-1002161 | B1 | | 12/2010 | |
| KR | 10-2012-0093772 | A | | 8/2012 | |
| KR | 2012093772 | A | * | 8/2012 | .......... H01M 10/052 |
| KR | 10-1603628 | B1 | | 3/2016 | |
| KR | 1777625 | B1 | * | 9/2017 | ............ C08F 220/12 |
| KR | 10-2018-0010789 | A | | 1/2018 | |
| KR | 2018010789 | A | * | 1/2018 | ......... C08G 73/1042 |
| KR | 10-2018-0071732 | A | | 6/2018 | |
| KR | 10-2019-0022332 | A | | 3/2019 | |
| KR | 2019022332 | A | * | 3/2019 | ......... C08G 73/1067 |
| KR | 2019059865 | A | * | 5/2019 | ............ B65H 20/16 |
| KR | 10-2019-0125986 | A | | 11/2019 | |
| KR | 2019125986 | A | * | 11/2019 | ............ C08L 47/00 |
| KR | 10-2020-0082480 | A | | 7/2020 | |
| WO | WO-2019004459 | A1 | * | 1/2019 | ............... C08K 5/16 |

\* cited by examiner

COMPOSITION FOR COATING SEPARATOR, METHOD FOR MANUFACTURING SEPARATOR BY USING SAME, SEPARATOR, AND LITHIUM BATTERY EMPLOYING SAME

CROSS REFERENCE TO RELATED APPLICATIONS

This is the U.S. national phase application of PCT/KR2022/002587, filed Feb. 22, 2022, which clams priority to Korean Patent Application No. KR 10-2021-0028899, filed Mar. 4, 2021, the entire contents of all of which are hereby incorporated by reference.

TECHNICAL FIELD

The present disclosure relates to a composition for coating a separator, a method of preparing a separator by using the same, a separator, and a lithium battery employing the separator.

BACKGROUND ART

In accordance with the emergence of various miniaturized, high-performance electronic devices, miniaturization and weight reduction is becoming more important in the field of lithium batteries. In addition, discharge capacity, energy density, and cycle characteristics of lithium batteries are becoming important in order to be applied in fields such as electric vehicles. In order to meet the above needs, a lithium battery having high discharge capacity per unit volume, high energy density, and excellent lifespan characteristics is required.

In a lithium battery, a separator is arranged between a positive electrode and a negative electrode to prevent a short circuit. An electrode assembly including a positive electrode, a negative electrode, and a separator arranged between the positive electrode and the negative electrode is wound to have a jelly roll shape, and in order to improve adhesive force between the positive/negative electrode and the separator in the electrode assembly, the jelly roll is roll-pressed.

Olefin-based polymers are widely used as separators for lithium batteries. Olefin-based polymers have excellent flexibility, but have low strength when immersed in a liquid electrolyte, and may cause a short circuit of a battery due to rapid thermal shrinkage at a high temperature of 100° C. or higher. In order to solve this issue, for example, a separator having a shutdown function added by using polyethylene wax on a porous olefin-based polymer substrate has been proposed. However, the polyethylene wax-coated separator does not maintain the coating layer at a high temperature because the polyethylene wax dissolves, and thus, a contact area of an electrode plate increases and thermal runaway increases.

Therefore, a separator capable of improving battery stability at high temperatures is required.

DESCRIPTION OF EMBODIMENTS

Technical Problem

An aspect is to provide a composition for coating a separator having high thermal resistance characteristics.

Another aspect is to provide a method of preparing a separator using the composition.

Still another aspect is to provide a separator prepared by the above preparing method.

Still another aspect is to provide a lithium battery including the separator.

Solution to Problem

According to an aspect, provided is a composition for coating a separator, including: a binder including an aqueous cross-linking reactive polyacrylamide-based copolymer; inorganic particles; and water, wherein the polyacrylamide-based copolymer includes at least two cross-linking reactive groups that are cross-linkable with each other.

According to another aspect, provided is a method of preparing a separator, including: coating the composition for coating a separator on one surface or both surfaces of a porous substrate; and drying the porous substrate coated with the composition with hot air to obtain a separator having a coating layer arranged on the porous substrate.

According to still another aspect, provided is a separator, including: a porous substrate; and a dried cross-linked product of the composition for coating a separator arranged on one surface or both surfaces of the porous substrate.

According to still another aspect, provided is a lithium battery, including: a positive electrode; a negative electrode; and the separator arranged between the positive electrode and the negative electrode.

Advantageous Effects of Disclosure

According to an aspect, a composition for coating a separator may be used as a one-part type without a cross-linker, and a separator having high thermal resistance characteristics may be prepared by using the composition.

EXPLANATION OF REFERENCE NUMERALS DESIGNATING MAJOR ELEMENTS OF THE DRAWINGS

11 Porous substrate; 12, 13 Coating layer;
1 Lithium battery; 2 Negative electrode;
3 Positive electrode; 4 Separator;
5 Battery case; 6 Cap assembly;
7 Pouch

MODE OF DISCLOSURE

The present inventive concept described hereinafter may be modified in various ways, and may have many examples, and thus, certain examples are illustrated in the drawings, and are described in detail in the specification. However, this does not intend to limit the present inventive concept within particular embodiments, and it should be understood that the present disclosure includes all the modifications, equivalents, and replacements within the technical scope of the present inventive concept.

Terms used herein were used to describe particular examples, and not to limit the present inventive concept. As used herein, the singular of any term includes the plural, unless the context otherwise requires. The expression of "include" or "have", used herein, indicates an existence of a characteristic, a number, a phase, a movement, an element, a component, a material, or a combination thereof, and it should not be construed to exclude in advance an existence or possibility of existence of at least one of other characteristics, numbers, movements, elements, components, materials, or combinations thereof. As used herein, "/" may be interpreted to mean "and" or "or" depending on the context.

In the drawings, a thickness is enlarged or reduced to clearly represent various layers and regions. The same reference numerals were attached to similar portions throughout the disclosure. As used herein throughout the disclosure, when a layer, a membrane, a region, or a plate is described to be "on" or "above" something else, it not only includes the case in which it is right above something else but also the case when other portion(s) are present in-between. Terms like "first", "second", and the like may be used to describe various components, but the components are not limited by the terms. The terms are used merely for the purpose of distinguishing one component from other components.

In this specification, a reference to any monomer(s) generally refers to a monomer that may be polymerized with another polymerizable component, such as another monomer or polymer. It is to be understood that, unless otherwise indicated, once a monomeric component reacts with another component to form a compound, the compound will contain a residue of such a component.

The term "polymer", used herein, is intended to refer to prepolymers, oligomers, homopolymers, copolymers, and blends or mixtures thereof.

The expression "combination thereof", used herein, may mean a mixture of constituents, copolymers, blends, alloys, composites, reaction products, and the like.

Hereinafter, a composition for coating a separator according to example embodiments, a method of preparing a separator by using the same, a separator, and a lithium battery employing the separator will be described in more detail.

According to an aspect, a composition for coating a separator includes:
a binder including an aqueous cross-linking reactive polyacrylamide-based copolymer; inorganic particles; and water, wherein
the polyacrylamide-based copolymer includes at least two cross-linking reactive groups that are cross-linkable with each other.

The composition for coating a separator provides a separator in which a coating layer is formed by coating on one surface or both surfaces of a porous substrate. A separator having higher thermal resistance as compared to existing separators in the art may be prepared by using the composition for coating a separator. In addition, the separator prepared by using the composition may improve lifespan characteristics of a lithium battery.

The composition for coating a separator includes an aqueous cross-linking reactive polyacrylamide-based copolymer as a binder, wherein the polyacrylamide-based copolymer includes at least two cross-linking reactive groups that are cross-linkable with each other. The composition for coating a separator, by including such an aqueous cross-linking reactive polyacrylamide-based copolymer, may be used as a one-part type without a cross-linker, and the at least two cross-linking reactive groups may have a cross-linking reaction with each other through a self-condensation reaction. Through this, a coating layer of a separator may be formed, and a separator having higher thermal resistance characteristics than existing separators may be provided.

According to an example, the cross-linking reactive group may include: at least one first functional group selected from a carboxyl group, an amine group, and an isocyanate group; and at least one second functional group selected from a hydroxyl group, an epoxy group, and an oxazoline group, and a cross-linking reaction may occur between the first functional group and the second functional group, for bonding. For example, a carboxyl group and a hydroxyl group may be included as the cross-linking functional group.

According to an example, an equivalent ratio of the first functional group to the second functional group may be in a range of 30:70 to 70:30. The equivalent ratio of the first functional group to the second functional group may be in a range of, for example, about 35:65 to about 65:35, about 40:60 to about 60:40, or about 45:55 to about 55:45, for example, about 50:50. Within the range, cross-linking reactions between the first functional group and the second functional group may occur smoothly.

According to an example, the polyacrylamide-based copolymer includes (N-substituted) amide-based monomers, and the (N-substituted)amide-based monomers may include at least one selected from the group consisting of (meth) acrylamide, N,N-dialkyl (meth)acrylamides such as N,N-dimethyl (meth)acrylamide, N,N-diethyl (meth)acrylamide, N,N-dipropyl (meth)acrylamide, N,N-diisopropyl (meth) acrylamide, N,N-di(n-butyl) (meth)acrylamide, and N,N-di (t-butyl) (meth)acrylamide, N-ethyl (meth)acrylamide, N-isopropyl (meth)acrylamide, N-butyl (meth)acrylamide, N-n-butyl (meth)acrylamide, N-methylol (meth)acrylamide, N-ethylol (meth)acrylamide, N-methylolpropane (meth) acrylamide, N-methoxymethyl (meth)acrylamide, N-methoxyethyl (meth)acrylamide, N-butoxymethyl (meth) acrylamide, and N-acryloylmorpholine.

A content of the (N-substituted)amide-based monomers may be in a range of about 30 mol % to about 90 mol %, for example, about 40 mol % to about 80 mol %, or about 50 mol % to about 70 mol %, with respect to the total moles of the monomer components constituting the polyacrylamide-based copolymer. By using a polyacrylamide-based copolymer having (N-substituted) amide-based monomers in the above range, a characteristic of a decomposition temperature of 200° C. or more may be exhibited.

According to an example, the polyacrylamide-based copolymer may include:
(N-substituted) amide-based monomers; and
one or at least two acrylic monomer selected from the group consisting of carboxyl group-containing monomers, (meth)acrylic acid alkyl-based monomers, hydroxyl group-containing monomers, isocyanate group-containing monomers, oxazoline group-containing monomers, multifunctional (meth)acrylate-based monomers, acid anhydride group-containing monomers, sulfonic acid group-containing monomers, phosphoric acid group-containing monomers, succinimide-based monomers, maleimide-based monomers, itaconimide-based monomers, cyano-containing monomers, (meth)acrylic acid aminoalkyl-based monomers, (meth)acrylic acid alkoxyalkyl-based monomers, epoxy group-containing acrylic monomers, acrylic acid ester-based monomers having heterocycles, halogen atoms, silicon atoms, etc., acryloylmorpholine, (meth)

acrylic acid esters having an alicyclic hydrocarbon group, (meth)acrylic acid esters having an aromatic hydrocarbon group, and (meth)acrylic acid esters obtained from terpene compound-derived alcohols.

Here, two or more functional groups cross-linkable with each other may be present in the (N-substituted) amide-based monomers and the acrylic monomers, or may be present only in the acrylic monomers.

Specific examples of the acrylic monomers include:

carboxyl group-containing monomers such as acrylic acid, (meth)acrylic acid, carboxyethyl acrylate, carboxypentyl acrylate, itaconic acid, maleic acid, fumaric acid, crotonic acid, and isocrotonic acid, etc.;

alkyl (meth)acrylate-based monomers having a linear or branched chain alkyl group having 1 to 20 carbon atoms in the ester portion, specifically, for example, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, isopentyl (meth)acrylate, hexyl(meth)acrylate, cyclohexyl (meth)acrylate, 2-ethylhexyl (meth)acrylate, heptyl(meth)acrylate, octyl(meth)acrylate, isooctyl(meth)acrylate, nonyl (meth)acrylate, isononyl(meth)acrylate, decyl(meth) acrylate, isodecyl(meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, heptadecyl(meth)acrylate, octadecyl(meth)acrylate, isooctadecyl(meth)acrylate, nonadecyl(meth)acrylate, myristyl(meth)acrylate, palmityl(meth)acrylate, stearyl (meth)acrylate, and n-tetradecyl(meth)acrylate, etc.;

hydroxyl group-containing monomers such as 2-hydroxyethyl (meth)acrylic acid, 2-hydroxypropyl (meth) acrylic acid, 2-hydroxybutyl (meth)acrylic acid, 3-hydroxypropyl (meth)acrylic acid, 4-hydroxybutyl (meth) acrylic acid, 6-hydroxyhexyl (meth)acrylic acid, 8-hydroxyoctyl (meth)acrylic acid, 10-hydroxydecyl (meth)acrylic acid, 12-hydroxylauryl (meth)acrylic acid, (4-hydroxymethylcyclohexyl) methyl (meth) acrylate, and hydroxyalkyl (meth)acrylic acid, etc.;

multifunctional (meth)acrylate-based monomers such as hexanediol diacrylate (HDDA), tripropylene glycol diacrylate (TPGDA), ethylene glycol diacrylate (EGDA), trimethylolpropane triacrylate (TMPTA), trimethylolpropaneethoxy triacrylate (TMPEOTA), glycerin propoxylated triacrylate (GPTA), pentaerythritol tetraacrylate (PETA), or dipentaerythritol hexaacrylate (DPHA), etc.;

acid anhydride group-containing monomers such as maleic anhydride and itaconic anhydride, etc.;

sulfonic acid group-containing monomers such as 2-(meth)acrylamido-2-methylpropane sulfonic acid, (meth)acrylamidopropane sulfonic acid, sulfopropyl (meth)acrylate, (meth)acryloyloxynaphthalene sulfonic acid, etc.;

phosphoric acid group-containing monomers such as [2-(2-hydroxyethyl)acryloyl] phosphate, etc.;

succinimide-based monomers such as N-(meth)acryloyloxymethylene succinimide, N-(meth)acryloyl-6-oxyhexamethylene succinimide, N-(meth)acryloyl-8-oxyhexamethylene succinimide, etc.;

maleimide-based monomers such as N-cyclohexyl maleimide, N-isopropyl maleimide, N-lauryl maleimide, N-phenyl maleimide, etc.;

itaconimide-based monomers such as N-methyl itaconimide, N-ethyl itaconimide, N-butyl itaconimide, N-octyl itaconimide, N-2-ethylhexyl itaconimide, N-cyclohexyl itaconimide, N-Lauryl itaconimide, etc.;

cyano-containing monomers such as acrylonitrile, (meth) acrylonitrile, etc.;

(meth)acrylic acid aminoalkyl-based monomers such as aminoethyl (meth)acrylic acid, N,N-dimethylaminoethyl (meth)acrylic acid, N,N-dimethylaminoethyl (meth)acrylic acid, t-butylaminoethyl (meth)acrylic acid, etc.;

(meth)acrylic acid alkoxyalkyl-based monomers such as methoxyethyl (meth)acrylic acid, ethoxyethyl (meth) acrylic acid, propoxyethyl (meth)acrylic acid, butoxyethyl (meth)acrylic acid, ethoxypropyl (meth)acrylic acid, etc.;

epoxy group-containing acrylic monomers such as glycidyl (meth)acrylic acid;

acrylic acid ester-based monomers having heterocycles, halogen atoms, silicon atoms, etc., such as (meth) acrylic acid tetrahydrofurfuryl, fluorine atom-containing (meth)acrylate, silicon (meth)acrylate, etc.;

acryloylmorpholine;

(meth)acrylic acid esters having an alicyclic hydrocarbon group such as cyclopentyl (meth)acrylate, cyclohexyl (meth)acrylate, isobornyl (meth)acrylate, dicyclopentanyl (meth)acrylate, etc.;

(meth)acrylic acid esters having an aromatic hydrocarbon group such as phenyl (meth)acrylate, phenoxyethyl (meth)acrylate, etc.;

and (meth)acrylic acid esters obtained from terpene compound-derived alcohols.

The polyacrylamide-based copolymer may be used in combination of one or more of the aforementioned acrylic monomers.

According to an example, a molar ratio of the (N-substituted) amide-based monomers to the acrylic monomers may be in a range of about 1:99 to about 99:1. For example, the molar ratio of the (N-substituted) amide-based monomers to the acrylic monomers may be in a range of about 20:80 to about 80:20, for example, about 30:70 to about 70:30, for example, about 40:60 to about 60:40, for example, about 50:50. Within the above range, a separator coating layer having improved thermal resistance may be formed.

A weight average molecular weight of the polyacrylamide-based copolymer may be about 100,000 g/mol to about 1,000,000 g/mol. For example, the weight average molecular weight of the polyacrylamide-based copolymer may be about 150,000 g/mol to about 800,000 g/mol, specifically, about 200,000 g/mol to about 700,000 g/mol, and more specifically, about 300,000 g/mol to about 600,000 g/mol. Within the range, it is possible to manufacture a coated separator having a low shrinkage rate when stored at a high temperature. For example, within the above range, a coated separator having a shrinkage rate of 5% or less when stored at 150° C. for 1 hour may be prepared.

The polyacrylamide-based copolymer may have a glass transition temperature of 150° C. or higher. For example, the glass transition temperature of the polyacrylamide-based copolymer may be about 150° C. to about 300° C., specifically, about 170° C. to about 280° C., and more specifically, about 190° C. to about 250° C. Within the above range, a separator coating layer having high thermal resistance may be formed.

According to an example, the polyacrylamide-based copolymer may be an aqueous cross-linking reactive polyacrylamide-acrylic acid-hydroxyethyl acrylic copolymer.

According to an example, the polyacrylamide-based copolymer may further include one or more types of non-acrylic monomers. The polyacrylamide-based copolymer may further improve thermal resistance of the copolymer and binding ability of the separator to a porous substrate, by further including one or more non-acrylic monomers.

For the non-acrylic monomers included in the polyacrylamide-based copolymer, any copolymeric monomers other than the aforementioned acrylic monomers may be used without a particular limitation. Examples of the copolymeric non-acrylic monomers include, for example, vinyl esters, nitrogen-containing heterocyclic monomers, N-vinyl carboxylic acid amides, lactam-based monomers, olefin-based monomers, vinyl ether-based monomers, aromatic vinyl compounds, olefins or dienes, vinyl ethers, vinyl chloride, sulfonic acid group-containing monomers, imide group-containing monomers, isocyanate group-containing monomers, etc., and at least one may be selected therefrom.

Specific examples of the copolymeric non-acrylic monomers include:
- vinyl esters such as vinyl acetate, vinyl propionate, etc.;
- nitrogen-containing heterocyclic monomers such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-2-piperidone, N-vinyl-3-morpholinone, N-vinyl 2-caprolactam, N-vinyl-1, 3-oxazin-2-one, N-vinyl-3, 5-morpholinedione, N-vinylpyrazole, N-vinylisoxazole, N-vinylthiazole, N-vinylisothiazole, N-vinylpyridazine, etc.;
- N-vinyl carboxylic acid amides;
- lactam-based monomers such as N-vinylcaprolactam, etc.;
- olefin-based monomers such as isoprene, butadiene, isobutylene, etc.;
- vinyl ether-based monomers such as methyl vinyl ether, ethyl vinyl ether, etc.;
- aromatic vinyl compounds, such as vinyl toluene, styrene, etc.;
- olefins or dienes such as ethylene, butadiene, isoprene, isobutylene, etc.;
- vinyl ethers such as vinyl alkyl ether;
- vinyl chloride;
- sulfonic acid group-containing monomers such as styrene sulfonic acid, allyl sulfonic acid, and sodium vinyl sulfonic acid;
- imide group-containing monomers such as cyclohexylmaleimide, isopropylmaleimide, etc.; and
- isocyanate group-containing monomers such as 2-isocyanate ethyl (meth)acrylate, etc.

One of these non-acrylic monomers may be used alone, or these non-acrylic monomers may be used in combination of two or more.

A content of the non-acrylic monomer included in the polyacrylamide-based copolymer is not particularly limited and may be used within a range that does not impair aqueous cross-linking reactive characteristics of the polyacrylamide-based copolymer and high thermal resistance characteristics of the separator. For example, the non-acrylic monomer may be included in a range of about 0.1 mol % to about 30 mol %, with respect to the total moles of monomer components constituting the polyacrylamide-based copolymer. Within the above range, it is possible to provide a polyacrylamide-based copolymer having improved thermal resistance and substrate binding ability of the polymer.

A content of the polyacrylamide-based copolymer may be about 10 wt % to about 100 wt %, with respect to the total weight of the binder. For example, the content of the polyacrylamide-based copolymer may be about 30 wt % to about 95 wt %, about 50 wt % to about 90 wt %, or about 60 wt % to about 80 wt %, with respect to the total weight of the binder. Within the above range, it is possible to provide a composition for coating a separator having improved thermal resistance and substrate binding ability.

The composition for coating a separator may further include an aqueous binder commonly used in the art as a binder. Eamples of the commonly used aqueous binder include, for example, at least one selected from polyvinyl alcohol, polyvinyl acetate, polyacrylic acid, polyacrylic acid ester, polymethacrylic acid, polymethacrylic acid ester, poly-N-vinylcarboxylic acid amide, polyacrylonitrile, polyether, polyamide, ethylene vinyl acetate copolymer, polyethylene oxide, cellulose acetate, cellulose acetate butylate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, and polyimide.

For inorganic particles included in the composition for coating a separator, possibility of a short circuit between a positive electrode and a negative electrode is reduced by including the inorganic particles in a coating layer of a separator formed from the composition, and thereby, battery stability may be enhanced. The inorganic particles included in the composition for coating a separator may be a metal oxide, a metalloid oxide, or a combination thereof. Specifically, the inorganic particles may be alumina, titania, boehmite, barium sulfate, calcium carbonate, calcium phosphate, amorphous silica, crystalline glass particles, kaolin, talc, silica-alumina composite oxide particles, calcium fluoride, lithium fluoride, zeolite, molybdenum sulfide, mica, magnesium oxide, and the like. The inorganic particles may be, for example, $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or combinations thereof. Considering crystal growth and economic efficiency of a vinylidene fluoride-hexafluoropropylene copolymer, the inorganic particles may be alumina, titania, boehmite, barium sulfate, or a combination thereof. The inorganic particles may be spherical, plate-like, fibrous, etc., but are not limited thereto, and any form that may be used in the art may be used. Plate-like inorganic particles include, for example, alumina and boehmite. In this case, reduction of a separator area at a high temperature may be further suppressed, relatively large porosity may be secured, and characteristics of a lithium battery may be improved during penetration evaluation. When the inorganic particles are plate-like or fibrous, the inorganic particles may have an aspect ratio of about 1:5 to about 1:100. For example, the aspect ratio may be about 1:10 to about 1:100. For example, the aspect ratio may be about 1:5 to about 1:50. For example, the aspect ratio may be about 1:10 to about 1:50. On a flat surface of plate-like inorganic particles, a ratio of long-to-short axis may be about 1 to about 3. For example, on the flat surface, a long-to-short axis ratio may be about 1 to about 2. For example, on the flat surface, a long-to-short axis ratio may be about 1. The aspect ratio and long-to-short axis ratio may be measured by using a scanning electron microscope (SEM). Within the ranges of the aspect ratio and the long-to-short axis ratio, shrinkage of the separator may be suppressed, relatively improved porosity may be secured, and penetration characteristics of a lithium battery may be improved. When the inorganic particles are in a form of a plate, an average angle of the flat surface of the inorganic particles with respect to one surface of a porous substrate may be about 0 degrees to about 30 degrees. For example, the angle of the flat surface of the inorganic particles with respect to one surface of the porous substrate may converge to 0 degree. That is, one surface of the porous substrate and the flat surface of the inorganic particles may be parallel. For example, when the average angle of the flat surface of the inorganic compound with respect to one surface of the porous substrate is within the above range, thermal shrinkage of the porous substrate may be effectively prevented, and a separator with a reduced shrinkage rate may be provided. Organic particles may be cross-linked polymers. Organic particles may be highly cross-linked polymers showing no glass transition temperature (Tg). When a highly cross-linked polymer is used, thermal resistance is improved and shrinkage of the porous substrate at high temperatures may be effectively suppressed.

In the composition for coating a separator, a weight ratio of a total weight of the binder to a weight of the inorganic particles may be about 0.1:99.9 to about 50:50. For example, the weight ratio of the total weight of the binder to the weight of the inorganic particles may be about 1:99 to about 20:80, or about 3:97 to about 30:70. Within the range, it is possible to provide a composition for coating a separator having excellent substrate binding ability and excellent thermal resistance.

The composition for coating a separator may further include organic particles. Organic particles may include, for example, styrene-based compounds and derivatives thereof, methyl methacrylate-based compounds and derivatives thereof, acrylate-based compounds and derivatives thereof, diallyl phthalate-based compounds and derivatives thereof, polyimide-based compounds and derivatives thereof, polyurethane-based compounds and derivatives thereof, copolymers thereof, or combinations thereof, but are not limited thereto, and any material that may be used as organic particles in the art may be used. For example, the organic particles may be cross-linked polystyrene particles, or cross-linked polymethyl methacrylate particles. The particles may be secondary particles formed by aggregation of primary particles. In a separator including secondary particles, porosity of a coating layer is increased, and thus, a lithium battery having excellent high output characteristics may be provided.

The composition for coating a separator may be provided in a form of slurry, by including water as a solvent capable of dispersing the above-described components. The composition for coating a separator may further include an organic solvent as long as the aqueous characteristics are not impaired. The organic solvent may be an alcohol-based organic solvent. For example, the organic solvent may include at least one selected from the group consisting of methanol, ethanol, propanol, and butanol. By using an alcohol-based organic solvent, it is possible to provide a composition for coating a separator that is harmless to the body and has excellent drying characteristics, thereby securing mass productivity without reducing productivity. According to an example, the water and organic solvent may be included in a volume ratio of about 100:0 to about 60:40. For example, the water and organic solvent may be included in a volume ratio of about 95:5 to about 80:20, specifically, for example, may be included in a volume ratio of about 85:15 to about 70:30. Within the above range, it is possible to provide a composition for coating a separator having enhanced drying characteristics.

The solvent is volatilized through drying after coating with the composition for coating a separator, and thus, the solvent does not exist in the finally obtained coating layer of the separator.

A method of preparing a separator according to an embodiment includes: coating the composition for coating a separator on one surface or both surfaces of a porous substrate; and drying the porous substrate coated with the composition for coating a separator with hot air to obtain a separator having a coating layer arranged on the porous substrate.

First, the composition for coating a separator is coated on one surface or both surfaces of the porous substrate while moving the porous substrate.

A method of coating the composition for coating a separator on one surface or both surfaces of the moving porous substrate is not particularly limited, and for example, at least one selected from a forward roll coating method, a reverse roll coating method, a microgravure coating method, and a direct metering coating method may be used, but is not necessarily limited to these methods. The coating method may be, for example, a direct metering coating method.

Subsequently, the porous substrate coated with the composition for coating a separator is moved into a dryer.

In the dryer, the porous substrate coated with the composition for coating a separator is dried with hot air, and thus, a separator with a coating layer arranged on the porous substrate is prepared. The porous substrate coated with the composition for coating a separator is fed to the dryer from one side, dried by hot air in the dryer, and then discharged from the other side of the dryer. In the dryer, hot air is supplied from upper nozzles and lower nozzles arranged alternately or symmetrically on upper and lower portions of the porous substrate coated with the composition for coating a separator.

A moving speed of the porous substrate in the dryer may be the same as a coating speed. When the moving speed of the porous substrate is too slow, inorganic particles included in the composition for coating a separator are mainly distributed at an interface between the coating layer and the porous substrate, and thus, binding force between the coating layer and the porous substrate may decrease. When the moving speed of the porous substrate is too fast, the inorganic particles in the coating layer are mainly distributed near the surface of the coating layer facing the electrode, and thus, binding force between the separator and the electrode may decrease.

A hot air supply rate in the dryer may be, for example, about 10 m/s to about 50 m/s, about 10 m/s to about 40 m/s, about 10 m/s to about 30 m/s, or about 10 m/s to about 20 m/s, and a drying completion rate may be greater than 15 mpm. By having a hot air supply rate and drying completion rate within the ranges, a production speed may be enhanced, and a separator in which bending strength and peel strength are improved at the same time may be prepared. When the hot air supply rate is too low, the inorganic particles included in the composition for coating a separator are mainly distributed at an interface between the coating layer and the porous substrate, and thus, binding force between the coating layer and the porous substrate may decrease. When the hot air supply rate is too high, the inorganic particles in the coating layer are mainly distributed near the surface of the coating layer facing the electrode, and thus, binding force between the composite separator and the electrode may decrease.

The hot air-drying temperature in the dryer may be, for example, about 30° C. to about 80° C., about 35° C. to about 75° C., about 40° C. to about 70° C., or about 45° C. to about 65° C. By having a hot air temperature within this range, a separator having improved bending strength and peel strength at the same time may be prepared. When the hot air-drying temperature is too low, drying may be incomplete. When the hot air-drying temperature is too high, a uniform coating layer structure may not be obtained due to rapid volatilization of the solvent.

Retention time of the porous substrate in the dryer is, for example, about 10 seconds to about 50 seconds, about 10 seconds to about 45 seconds, about 10 seconds to about 40 seconds, about 10 seconds to about 35 seconds, or about 10 seconds to about 30 seconds. By having a retention time in the dryer within this range, a separator having improved bending strength and peel strength at the same time may be prepared. When the retention time of the porous substrate in the dryer is too short, uniform phase separation may not be achieved. When the retention time of the porous substrate in the dryer is excessively long, the base film may shrink and pores of the entire membrane may shrink.

During hot air-drying in the dryer, a non-solvent supplied into the dryer may be at least one selected from water and alcohol. The non-solvent may be, for example, water vapor. The alcohol may be, for example, methanol, ethanol, propanol, and the like.

A separator according to another embodiment includes a porous substrate; and a coating layer arranged on one surface or both surfaces of the porous substrate, wherein the coating layer includes a dried cross-linked product of the above-described composition for coating a separator.

The coating layer comes to include a binder including an aqueous cross-linking reactive polyacrylamide-based copolymer and inorganic particles, as the composition for coating a separator is cross-linked and dried, and the two or more cross-linking reactive groups included in the polyacrylamide-based copolymer comes to have a mutually cross-linked form.

The separator may have a basis weight ratio of less than 0.6 calculated by Equation 1 below. Specifically, for example, the separator may have a basis weight ratio of 0.55 or less, 0.5 or less, 0.48 or less, 0.47 or less, 0.46 or less, or 0.45 or less. The basis weight ratio of the separator may be at least 0.40 or more. The separator may have a basis weight ratio of, for example, about 0.4 to about 0.55, and specifically, about 0.45 to about 0.5.

Basis weight ratio=unit weight of coating layer/unit weight of porous substrate <Equation 1>

For a coated separator, it was impossible to secure physical properties such as thermal resistance at a basis weight ratio of less than 0.6, but in the separator according to an embodiment, thermal resistance may be improved to a desired level even at a basis weight ratio of less than 0.6, by using the above-described composition for coating a separator.

A separator including a coating layer formed from the above-described composition for coating a separator may have very good physical properties such that a number of black dots per unit area (1 m$^2$) is less than 0.04. The separator may have a number of black dots per unit area (1 m$^2$) of 0.003 or less, 0.002 or less, or 0.001 or less.

An electrode assembly including the separator arranged between a positive electrode and a negative electrode, and wound in a jelly roll shape may have bending strength of 460 N or more and peel strength of 0.3 N/m or more. As the separator exhibits bending strength of 460 N or more and peel strength of 0.3 N/m or more, energy density and cycle characteristics of a lithium battery including the separator may be improved.

The porous substrate included by the separator may be a porous membrane including polyolefin. Polyolefin has an excellent effect of preventing a short circuit, and may also improve stability of a battery by a shutdown effect. For example, the porous substrate may be a membrane consisting of polyolefins such as polyethylene, polypropylene, polybutene, and polyvinyl chloride, and resins such as mixtures or copolymers thereof, but is not necessarily limited thereto and any porous membrane used in the art may be used. For example, a porous membrane consisting of a polyolefin-based resin; a porous membrane made by weaving polyolefin-based fibers; a non-woven fabric including polyolefin; and an aggregate of insulating material particles may be used. For example, a porous membrane including polyolefin has excellent coating properties for a binder solution which is used to prepare a coating layer formed on the substrate, and a thickness of the separation membrane may be reduced to increase a proportion of active materials in the battery and to increase capacity per unit volume.

The polyolefin used as a material of the porous substrate may be, for example, a homopolymer, a copolymer, or a mixture thereof of polyethylene or polypropylene. Polyethylene may be low-density, medium-density, or high-density polyethylene, and in regards to mechanical strength, high-density polyethylene may be used. In addition, two or more types of polyethylene may be mixed for a purpose of imparting flexibility. A polymerization catalyst used for preparing polyethylene is not particularly limited, and a Ziegler-Natta catalyst, a Phillips catalyst, a metallocene catalyst, or the like may be used. From a viewpoint of achieving both mechanical strength and high permeability, a weight average molecular weight of polyethylene may be about 100,000 to about 12,000,000, for example, about 200,000 to about 3,000,000. Polypropylene may be a homopolymer, a random copolymer, or a block copolymer, and may be used alone or in combination of two or more thereof. In addition, a polymerization catalyst is not particularly limited, and a Ziegler-Natta catalyst, or a metallocene catalyst may be used. In addition, stereoregularity is not particularly limited, and isotactic, syndiotactic, or atactic polypropylene may be used, but inexpensive isotactic polypropylene may be selected. In addition, polyolefin other than polyethylene or polypropylene and additives such as antioxidants may be added to the polyolefin within a range that does not impair the effects of the present disclosure.

The porous substrate included in the separator includes, for example, polyolefin such as polyethylene and polypropylene, and a multilayer membrane of two or more layers may be used, and a mixed multilayer membrane such as a polyethylene/polypropylene two-layer separator, a polyethylene/polypropylene/polyethylene three-layer separator, and polypropylene/polyethylene/polypropylene three-layer separator may be used, but is not limited thereto, and any material and configuration that may be used as a porous substrate in the art may be used. The porous substrate included in the separator may include, for example, a diene-based polymer prepared by polymerizing a monomer composition including diene-based monomers. The diene-based monomer may be a conjugated diene-based monomer, or a non-conjugated diene-based monomer. For example, the diene monomer includes at least one selected from the group consisting of 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinylnorbornene, dicyclopentadiene, and 1,4-hexadiene, but is not necessarily limited thereto, and any that may be used as a diene-based monomer in the art may be used.

The porous substrate included in the separator may have a thickness of about 1 μm to about 100 μm. For example, a thickness of the porous substrate may be about 1 μm to about 30 μm. For example, a thickness of the porous substrate may be about 5 μm to about 20 μm. For example, a thickness of the porous substrate may be about 5 μm to about 15 μm. For example, a thickness of the porous substrate may be about 5 μm to about 10 μm. When a thickness of the porous substrate is less than 1 μm, it may be difficult to maintain mechanical properties of the separator, and when a thickness of the porous substrate is more than 100 μm, internal resistance of the lithium battery may be increased. Porosity of the porous substrate included in the separator may be about 5% to about 95%. When the porosity is less than 5%, internal resistance of the lithium battery may increase, and when the porosity is greater than 95%, it may be difficult to maintain mechanical properties of the porous substrate. A pore size of the porous substrate in the separator may be about 0.01 μm to about 50 μm. For example, the pore size of the porous substrate in the separator may be about 0.01 μm to about 20 μm. For example, the pore size of the porous substrate in the separator may be about 0.01 μm to about 10 μm. When the pore size of the porous substrate is less than 0.01 μm, internal resistance of the lithium battery may be increased, and when the pore size of the porous substrate is more than 50 μm, it may be difficult to maintain mechanical properties of the porous substrate.

A coating layer may be arranged on one surface or both surfaces of the porous substrate. The coating layer is formed from the above-described composition for coating a separator. The coating layer may have, for example, a single-layer structure or a multi-layer structure. For example, the coating layer may be arranged on only one surface of the porous substrate and may not be arranged on the other surface. Also, the coating layer may have a multilayer structure. In a multi-layered coating layer, layers selected from organic layers, inorganic layers, and organic-inorganic layers may be arbitrarily arranged. The multi-layer structure may be a two-layer structure, a three-layer structure, or a four-layer structure, but is not necessarily limited to such a structure and may be selected according to required characteristics of the composite separator. Coating layers may be, for example, arranged on both surfaces of the porous substrate. The coating layers respectively arranged on both surfaces of the porous substrate may each independently be an organic layer, an inorganic layer, or an organic-inorganic layer, and at least one thereof includes the above-described composition for coating a separator. In addition, at least one of the coating layers respectively arranged on both surfaces of the porous substrate may have a multilayer structure. In a multi-layered coating layer, layers selected from organic layers, inorganic layers, and organic-inorganic layers may be arbitrarily arranged. The multi-layer structure may be a two-layer structure, a three-layer structure, or a four-layer structure, but is not necessarily limited to such a structure and may be selected according to required characteristics of the composite separator.

The coating layer included in the separator includes, for example, about 0.3 to about 0.4 pores with a diameter of about 500 nm to about 1,000 nm per 1 μm$^2$ and about 0.5 to about 1.5 pores with a diameter of less than 500 nm per 1 μm$^2$. A pore with a diameter of about 500 nm to about 1,000 nm per 1 μm$^2$ is, for example, a large-diameter pore, and a pore with a diameter of less than 500 nm per 1 μm$^2$ is, for example, a small-diameter pore. When a separator has a number of large-diameter pores and a number of small-diameter pores within the ranges, the composite separator may provide balanced air permeability.

When the number of large-diameter pores included in the separator is less than 0.3 and the number of small-diameter pores is greater than 0.15, air permeability of the separator is excessively increased. Accordingly, internal resistance of the separator impregnated with a liquid electrolyte increases, and thus, cycle characteristics of a lithium battery including the separator may deteriorate. When the number of large-diameter pores included in the separator is more than 0.4 and the number of small-diameter pores is less than 0.5, air permeability of the separator is excessively decreased. Therefore, it is difficult for the separator to suppress growth of lithium dendrites generated during charging/discharging processes, and a possibility of a short circuit or the like of the lithium battery including the separator increases. The air permeability is, for example, Gurley air permeability measured by measuring time required for 100 cc of air to pass through a separator according to JIS P-8117.

A surface of a coating layer included in a separator may have a morphology including, for example, a plurality of pores in a form of islands discontinuously arranged on a polymer membrane. The surface of the coating layer included in the separator may show a morphology in which a plurality of pores is discontinuously arranged on the polymer membrane. The surface of the coating layer is basically made of a polymer membrane, and may have a morphology in which pores are irregularly arranged in a form of islands on the polymer membrane. When the coating layer included in the separator has such a morphology, bending strength and peel strength of the separator may be improved. As a result, energy density and cycle characteristics of a lithium battery including the separator may be improved. In contrast, a surface of a coating layer included in a separator in the art does not show a polymer membrane, and shows a morphology in which a plurality of fine particles is connected to each other to form a porous surface.

A content of inorganic particles included in the coating layer may be 98 wt % or less, 85 wt % or less, or 80 wt % or less, with respect to a total weight of the coating layer. The content of the inorganic particles included in the coating layer formed from the composition for coating a separator may be 50 wt % or more, 55 wt % or more, or 60 wt % or more, with respect to the total weight of the coating layer. The content of the particles included in the coating layer formed from the composition for coating a separator may be about 55 wt % to about 99 wt %, about 60 wt % to about 85 wt %, or about 60 wt % to about 80 wt %, with respect to the total weight of the coating layer. When the coating layer formed from the composition for coating a separator includes particles within this range, bending strength and peel strength of the separator may be improved at the same time.

An average particle diameter of the inorganic particles included in the coating layer is about 100 nm to about 2 μm, about 150 nm to about 1.5 μm, or about 300 nm to about 1.0 μm. The average particle diameter of the inorganic particles may be measured by using, for example, a laser diffraction method or a measuring device employing a dynamic light scattering method. The average particle diameter of the inorganic particles is measured by using, for example, a laser scattering particle diameter distribution meter (for example, Horiba's LA-920), and is a value of a median particle diameter (D50) when 50% is accumulated from the side of small particles in volume conversion. Both binding force between the coating layer and the porous substrate and binding force between the coating layer and the electrode may be improved by using inorganic particles having an average particle diameter within this range. In addition, by using inorganic particles having an average particle diameter within this range, a separator including a coating layer including the inorganic particles may have appropriate porosity. When an average particle diameter of the inorganic particles is less than 100 nm, air permeability of the separator may decrease and moisture content may increase.

Figure 1:
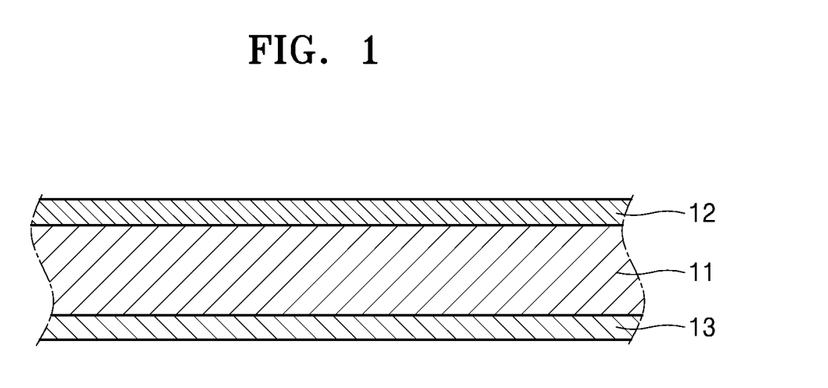
FIG. 1 is a schematic cross-sectional view of a separator according to an example embodiment.

A thickness of the coating layer may be, for example, about 0.5 μm to about 4 μm, about 0.5 μm to about 2.5 μm, or about 0.5 μm to about 2 μm per surface. When the thickness of the coating layer per surface is too great, a volume of the wound electrode assembly may increase. When the thickness of the coating layer per surface is too small, improved bending strength and peel strength may not be obtained. By arranging coating layers on both surfaces of the porous substrate, binding force between the coating layers and the electrode is further improved, and as a result, volume change during charging and discharging of the lithium battery may be suppressed. For example, referring to FIG. 1, coating layers 12 and 13 may be respectively arranged on both surfaces of a porous substrate 11 in a separator.

Porosity of the coating layer may be about 30% to about 90%, about 35% to about 80%, or about 40% to about 70%. When the coating layer has porosity within this range, an increase in internal resistance of the separator may be prevented, and excellent membrane strength may be provided while having excellent high-rate characteristics. The porosity of the coating layer is a volume occupied by pores in the total volume of the coating layer.

An application amount of the coating layer may be, for example, about 1.5 g/m² to about 4.5 g/m², about 1.7 g/m² to about 4.5 g/m², about 1.9 g/m² to about 4.5 g/m², or about 2.1 g/m² to about 4.5 g/m². When the application amount of the coating layer is within this range, the separator including the coating layer may simultaneously provide improved thermal resistance, peel strength, and bending strength. When the application amount of the coating layer is too small, improved bending strength and peel strength may not be obtained.

A binder included in the coating layer may not have a concentration gradient in which a concentration of the binder increases in a direction from an interface in contact with a porous substrate of the porous layer to a surface facing the electrode. For example, the binder may have a concentration gradient in which a concentration of the binder reduces from an interface in contact with the porous substrate of the porous layer to the surface facing the electrode, or a concentration gradient with no tendency to change in concentration.

A lithium battery according to another embodiment includes a positive electrode, a negative electrode, and the above-described separator arranged between the positive electrode and the negative electrode. According to an example, the lithium battery includes an electrode assembly including a positive electrode, a negative electrode, and the above-described separator arranged between the positive electrode and the negative electrode, and the electrode assembly may have a wound form in a jelly roll shape. As a lithium battery includes the above-described separator, black spot defects may be reduced and therefore, quality may be improved, and since adhesive force between an electrode (positive electrode and negative electrode) and a separator increases, a volume change during charging and discharging of the lithium battery may be suppressed. Accordingly, deterioration of a lithium battery accompanying a volume change of the lithium battery may be suppressed, and lifespan characteristics of the lithium battery may be improved.

A lithium battery may be prepared, for example, in the following way.

First, a negative electrode composition is prepared by mixing a negative active material, a conductive material, a binder, and a solvent. The negative active material composition may be directly coated on a metal current collector to prepare a negative electrode plate. Alternatively, the negative active material composition may be cast on a separate support and then a film separated from the support may be laminated on a metal current collector to prepare a negative electrode plate. The negative electrode is not limited to the above-described forms, but may have a form other than the forms.

The negative active material may be a non-carbon-based material. For example, the negative active material may include at least one selected from the group consisting of a metal capable of forming an alloy with lithium, an alloy of a metal capable of forming an alloy with lithium, and an oxide of a metal capable of forming an alloy with lithium.

For example, the metals alloyable with lithium may be Si, Sn, Al, Ge, Pb, Bi, Sb, and Si—Y alloy (Y may be an alkali metal, alkaline earth metal, group 13 to 16 element, transition metal, rare earth element, or a combination thereof, and is not Si), Sn—Y alloy (Y may be an alkali metal, alkaline earth metal, group 13 to 16 element, transition metal, rare earth element, or a combination thereof, and is not Sn), and the like. The element Y may be, for example, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be lithium titanium oxide, vanadium oxide, or lithium vanadium oxide.

For example, the non-transition metal oxide may be $SnO_2$, $SiO_x$ (0<x<2), etc.

Specifically, the negative active material may be at least one selected from the group consisting of Si, Sn, Pb, Ge, Al, SiOx(0<x≤2), SnOy(0<y≤2), $Li_4Ti_5O_{12}$, $TiO_2$, $LiTiO_3$, $Li_2Ti_3O_7$, but is not limited thereto, and any non-carbon-based negative active material used in the art may be used.

In addition, a composite of the non-carbon-based negative active material and a carbon-based material may be used, and a carbon-based negative active material may be additionally included in addition to the non-carbon-based material.

The carbon-based material may be crystalline carbon, amorphous carbon, or a mixture thereof. The crystalline carbon may be graphite such as non-shaped, plate-like, flake-like, spherical, or fibrous natural graphite or artificial graphite, and the amorphous carbon may be soft carbon (low-temperature calcined carbon), or hard carbon, mesophase pitch carbide, calcined coke, and the like.

As a conductive material, acetylene black, ketjen black, natural graphite, artificial graphite, carbon black, acetylene black, carbon fiber, metal powder such as copper, nickel, aluminum, or silver may be used, and one kind, or a mixture of one or more kinds of conductive materials such as polyphenylene derivatives may be used, but it is not limited thereto, and any material that may be used as a conductive material in the art may be used. In addition, the above-described crystalline carbon-based material may be added as a conductive material.

Examples of the binder include vinylidene fluoride/hexafluoropropylene copolymer, polyvinylidene fluoride (PVDF), polyacrylonitrile, polymethylmethacrylate, polytetrafluoroethylene (PTFE), mixtures thereof, or styrene butadiene rubber-based polymer or the like, but it is not necessarily limited thereto, and any binder used in the art may be used.

N-methylpyrrolidone, acetone, or water may be used as the solvent, but the solvent is not limited thereto, and any solvent that may be used in the art may be used.

Contents of the negative active material, conductive material, binder, and solvent are levels commonly used in lithium batteries. Depending on an intended use and configuration of the lithium battery, one or more of the conductive material, binder, and solvent may be omitted.

Meanwhile, the binder used for preparing the negative electrode may be the same as the composition for coating a separator included in the coating layer of the separator.

Next, a positive electrode composition is prepared by mixing a positive active material, a conductive material, a binder, and a solvent. The positive active material composition may be directly coated on a metal current collector to prepare a positive electrode plate. Alternatively, the positive active material composition may be cast on a separate support and then a film separated from the support may be laminated on a metal current collector to prepare a positive electrode plate.

At least one selected from lithium cobalt oxide, lithium nickel cobalt manganese oxide, lithium nickel cobalt aluminum oxide, lithium iron phosphate, and lithium manganese oxide may be included as a positive active material, but the positive active material is not limited thereto, and all that may be used as a positive active material in the art may be used.

For example, a compound represented by any one of the following formulas may be used: $Li_aA_{1-b}B_bD_2$ (wherein $0.90 \leq a \leq 1.8$, and $0 \leq b \leq 0.5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$.); $Li_aNi_bCo_cMn_dGeO_2$ (wherein $0.90 \leq a \leq 1.8$, $0 \leq b \leq 0.9$, $0 \leq c \leq 0.5$, $0 \leq d < 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In these formulas, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

A compound with a coating layer on a surface of the above-mentioned compound may be used, or a mixture of the above-mentioned compound and the compound with a coating layer may be used. The coating layer may include a compound of a coating element, such as an oxide of a coating element, a hydroxide of a coating element, an oxyhydroxide of a coating element, an oxycarbonate of a coating element, or a hydroxycarbonate of a coating element. Compounds constituting the coating layer may be amorphous or crystalline. As the coating element included in the coating layer, Mg, Al, Co, K, Na, Ca, Si, Ti, V, Sn, Ge, Ga, B, As, Zr, or mixtures thereof may be used. In a process of forming the coating layer, any coating method (for example, spray coating, an immersion method, etc.) may be used as long as the compound may be coated in a way that does not adversely affect physical properties of the positive active material by using these elements, and since this may be well understood by those skilled in the art, a detailed description thereof will be omitted.

For example, $LiNiO_2$, $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \leq x \leq 0.5$, and $0 \leq y \leq 0.5$), $LiFeO_2$, $V_2O_5$, TiS, MoS, and the like may be used.

In the positive active material composition, the conductive material, the binder, and the solvent may be the same as those in the negative active material composition. Meanwhile, it is also possible to form pores inside the electrode plate by adding a plasticizer to the positive active material composition and the negative active material composition.

Contents of the positive active material, conductive material, general binder, and solvent are levels commonly used in lithium batteries. Depending on an intended use and configuration of the lithium battery, one or more of the conductive material, binder, and solvent may be omitted.

Meanwhile, the binder used for preparing the positive electrode may be the same as the composition for coating a separator included in the coating layer of the separator.

Next, the above-described composite separator is inserted between the positive electrode and the negative electrode.

In an electrode assembly including a positive electrode/separator/negative electrode, the separator arranged between the positive electrode and the negative electrode includes a porous substrate; and a coating layer arranged on both surfaces of the porous substrate, as described above, wherein the coating layer includes the above-described composition for coating a separator.

A separator may be separately prepared and arranged between the positive electrode and the negative electrode. Alternatively, the separator may be prepared by: winding the electrode assembly including the positive electrode/separator/negative electrode into a jelly roll shape, then accommodating the jelly roll in a battery case or pouch; pre-charging the jelly roll accommodated in a battery case or pouch while thermally softening the jelly roll under pressure; hot rolling the charged jelly roll; cold rolling the filled jelly roll; and going through a formation process of charging and discharging the charged jelly roll under pressure.

Next, an electrolyte is prepared.

The electrolyte may be in a liquid or gel state.

For example, the electrolyte may be an organic liquid electrolyte. Also, the electrolyte may be solid. The electrolyte may be, for example, a boron oxide, lithium oxynitride, and the like, but is not limited thereto, and all that may be used as a solid electrolyte in the related art may be used. The solid electrolyte may be formed on the negative electrode by a method such as sputtering.

For example, an organic liquid electrolyte may be prepared. The organic liquid electrolyte may be prepared by dissolving a lithium salt in an organic solvent.

For the organic solvent, all that may be used as an organic solvent in the art may be used. The organic solvent may be, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethyl sulfoxide, dioxane, 1,2-dimethoxyethane, sulfolane, dichloroethane, chlorobenzene, nitrobenzene, diethylene glycol, dimethyl ether, a mixture thereof, etc.

For the lithium salt, all that may be used as a lithium salt in the art may be used. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are natural numbers), LiCl, LiI, or a mixture thereof.

Figure 2:
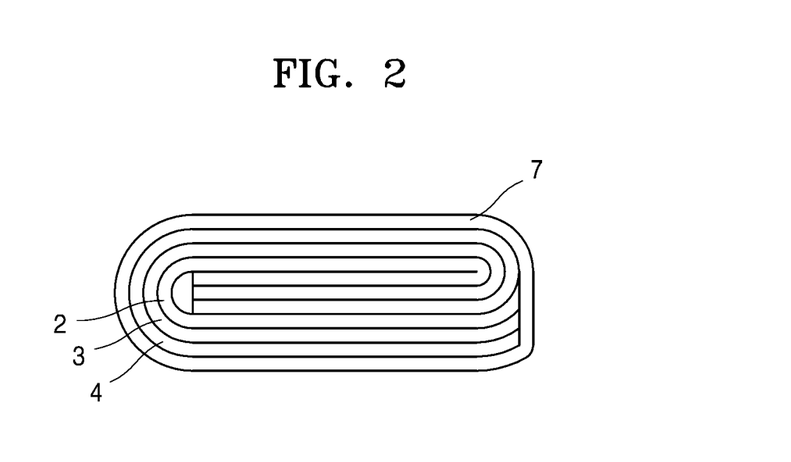
FIG. 2 is a schematic diagram of a lithium battery including an electrode assembly wound into a flat jelly roll shape, according to an example embodiment.

As shown in FIG. 2, the lithium battery 1 includes a positive electrode 3, a negative electrode 2, and a composite separator 4. After the positive electrode 3, the negative electrode 2, and the separator 4 are wound into an electrode assembly in a flat jelly roll shape, the electrode assembly is accommodated in a pouch 7. Then, an organic electrolyte is injected into the pouch 7 and the pouch is sealed to complete the lithium battery 1.

Figure 3:
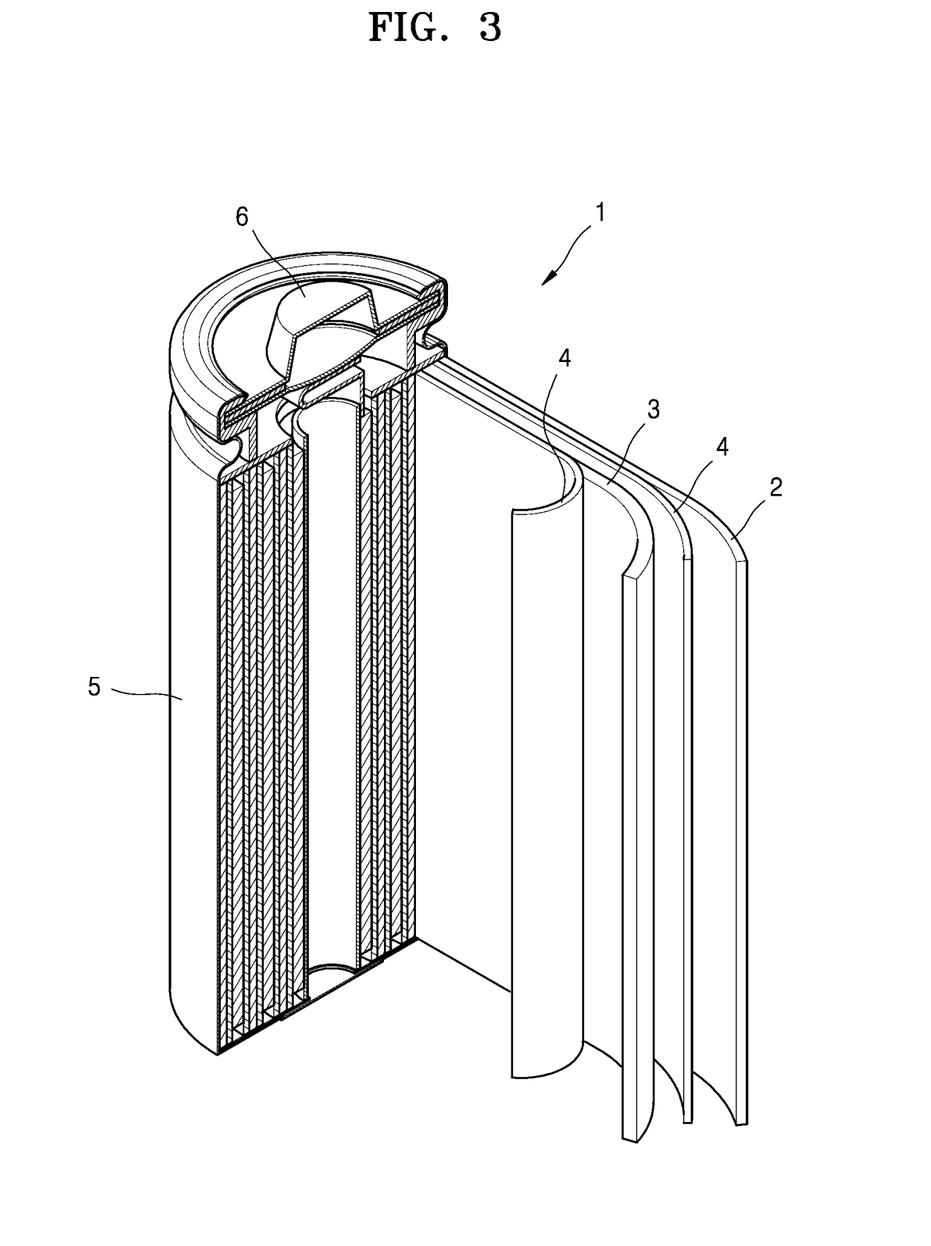
FIG. 3 is a schematic diagram of a lithium battery including an electrode assembly wound into a cylindrical jelly roll shape, according to an example embodiment.

As shown in FIG. 3, the lithium battery 1 includes a positive electrode 3, a negative electrode 2, and a separator 4. After the positive electrode 3, the negative electrode 2, and the separator 4 are wound into an electrode assembly in a cylindrical jelly roll shape, the electrode assembly is accommodated in a battery case 5. Subsequently, an organic liquid electrolyte is injected into the battery case 5 and the battery case is sealed with a cap assembly 6 to complete a lithium battery 1. The battery case may be a cylindrical shape, a prismatic shape, or a thin film type. The lithium battery may be a lithium-ion battery. The lithium battery may be a lithium polymer battery.

Since the lithium battery is excellent in high-rate characteristics and lifespan characteristics, the lithium battery is suitable to be used in electrical vehicles (EV). For example, the lithium battery may be suitable for a hybrid vehicle such as plug-in hybrid electric vehicle (PHEV).

The present inventive concept is explained in more detail through the following examples and comparative examples. However, the examples are for exemplifying the present inventive concept, and the scope of the present inventive concept is not limited thereto.

(Manufacture of Separator)

Example 1: Aqueous Cross-Linking Binder (Amide-Based Monomer 50 Mol %), Basis Weight Ratio 0.45

A coating solution was prepared by mixing 14.3 wt % of boehmite (ACTILOX 200SM, Nabaltec) with an average particle diameter (D50 by volume) of 0.3 μm, 0.5 wt % of a cross-linking reactive polyacrylamide-acrylic acid-hydroxyethylacrylic copolymer (Mw 400,000), in which a content of amide-based monomers is 50 mol %, with respect to the total moles of the monomer components constituting the copolymer, 0.2 wt % of PVA (Daejeong Chemical, Mw 22,000), and 85 wt % of DI water.

The coating solution was coated on a cross-section of a 5.5 μm thick polyethylene porous substrate (CZMZ, NW05535) by a bar coating method, and then dried under conditions of a temperature of 80° C. and wind velocity of 15 m/see to form a coating layer, and a coated separator having a basis weight ratio (unit weight of coating layer)/unit weight of porous substrate) of 0.45 was prepared.

Example 2: Aqueous Cross-Linking Binder (Amide-Based Monomer 60 Mol %), Basis Weight Ratio 0.45

A coated separator was prepared in the same manner as in Example 1, except that a cross-linking reactive polyacrylamide-acrylic acid-hydroxyethylacrylic copolymer having an amide monomer content of 60 mol %, with respect to the total moles of the monomer components constituting the copolymer was used, as a cross-linking reactive copolymer.

Example 3: Aqueous Cross-Linking Binder (Amide-Based Monomer 70 Mol %), Basis Weight Ratio 0.45

A coated separator was prepared in the same manner as in Example 1, except that a cross-linking reactive polyacrylamide-acrylic acid-hydroxyethylacrylic copolymer having an amide monomer content of 70 mol %, with respect to the total moles of the monomer components constituting the copolymer was used, as a cross-linking reactive copolymer.

Example 4: Aqueous Cross-Linking Binder (Amide-Based Monomer 80 Mol %), Basis Weight Ratio 0.45

A coated separator was prepared in the same manner as in Example 1, except that a cross-linking reactive polyacrylamide-acrylic acid-hydroxyethylacrylic copolymer having an amide monomer content of 80 mol %, with respect to the total moles of the monomer components constituting the copolymer was used, as a cross-linking reactive copolymer.

Comparative Example 1: Non-Cross-Linking CMS Binder Applied, Basis Weight Ratio 0.5

A coating solution was prepared by mixing 14.3 wt % of boehmite (ACTILOX 200SM, Nabaltec) with an average particle diameter (D50) of 0.3 μm, 0.5 wt % of carboxymethylcellulose (CMC) sodium salt (medium viscosity, Sigma Aldrich), 0.2 wt % of PVA (Daejeong Chemical, Mw 22,000), and 85 wt % of DI water.

The coating solution was coated on a cross section of a 5.5 μm thick polyethylene porous substrate (CZMZ, NW05535) to prepare a coated separator having a basis weight ratio (unit weight of coating layer/unit weight of porous substrate) of 0.5.

Comparative Example 2: Non-Cross-Linking CMS Binder Applied, Basis Weight Ratio 0.55

A coating solution was prepared by mixing 14.3 wt % of boehmite (ACTILOX 200SM, Nabaltec) with an average particle diameter (D50) of 0.3 μm, 0.5 wt % of carboxymethylcellulose (CMC) sodium salt (medium viscosity, Sigma Aldrich), 0.2 wt % of PVA (Daejeong Chemical, Mw 22,000), and 85 wt % of DI water.

The coating solution was coated on a cross section of a 5.5 μm thick polyethylene porous substrate (CZMZ, NW05535)

to prepare a coated separator having a basis weight ratio (unit weight of coating layer/unit weight of porous substrate) of 0.55.

Comparative Example 3: Non-Cross-Linking CMS Binder Applied, Basis Weight Ratio 0.6

A coating solution was prepared by mixing 14.3 wt % of boehmite (ACTILOX 200SM, Nabaltec) with an average particle diameter (D50) of 0.3 μm, 0.5 wt % of carboxymethylcellulose (CMC) sodium salt (medium viscosity, Sigma Aldrich), 0.2 wt % of PVA (Daejeong Chemical, Mw 22,000), and 85 wt % of DI water.

The coating solution was coated on a cross section of a 5.5 μm thick polyethylene porous substrate (CZMZ, NW05535) to prepare a coated separator having a basis weight ratio (unit weight of coating layer/unit weight of porous substrate) of 0.6.

Comparative Example 4: Non-Cross-Linking Polyacrylamide Binder Applied, Basis Weight Ratio 0.45

A coating solution was prepared by mixing 14.3 wt % of boehmite (ACTILOX 200SM, Nabaltec) with an average particle diameter (D50) of 0.3 μm, 0.5 wt % of polyacrylamide (Mw 400,000), 0.2 wt % of PVA (Daejeong Chemical, Mw 22,000), and 85 wt % of DI water.

The coating solution was coated on a cross section of a 5.5 μm thick polyethylene porous substrate (CZMZ, NW05535) to prepare a coated separator having a basis weight ratio (unit weight of coating layer/unit weight of porous substrate) of 0.45.

Evaluation Example 1: Evaluation of High Temperature Thermal Shrinkage Rate Characteristics A method of measuring a thermal shrinkage rate of a separator is not particularly limited, and a method commonly used in the technical field of the present disclosure may be used. A non-limiting example of a method of measuring a heat shrinkage rate of a separator is as follows:

the separators prepared in Example 1 and Comparative Examples 1 to 4 were each cut to a size of about 10 cm in width (MD) and about 10 cm in length (TD); the cut separators were stored in a chamber at 150° C. for 1 hour; degrees of shrinkage of the separators in the MD direction and TD direction were measured, and an MD direction thermal shrinkage rate and a TD direction thermal shrinkage rate were calculated by Equations 2 and 3, respectively; and between the MD direction thermal shrinkage rate and the TD direction thermal shrinkage rate, a higher value was calculated as the final value and shown in Table 1 below.

MD direction thermal shrinkage rate=(length reduced in MD direction after high temperature shrinkage evaluation/length of separator in MD direction before evaluation)×100   <Equation 2>

TD direction thermal shrinkage rate=(length reduced in TD direction after high temperature shrinkage evaluation/length of separator in TD direction before evaluation)×100   <Equation 3>

Values calculated by Equations 2 and 3 are shown in Table 1 below.

TABLE 1

| | Thermal shrinkage rate (150° C., 1 hour) | |
|---|---|---|
| | MD direction (%) | TD direction (%) |
| Example 1 | 2 | 2 |
| Example 2 | 3 | 2 |
| Example 3 | 3 | 4 |
| Example 4 | 5 | 5 |
| Comparative Example 1 | ≥50 | ≥50 |
| Comparative Example 2 | 20 | 15 |
| Comparative Example 3 | 4 | 4 |
| Comparative Example 4 | ≥50 | ≥50 |

Referring to Table 1, it may be seen that in Example 1 in which the separator was coated by using the cross-linking reactive polyacrylamide-based copolymer, as compared to Comparative Examples 1 to 3 in which CMC used in the art was used as a binder instead of a cross-linked binder, and Comparative Example 4, in which polyacrylamide without a cross-linking reactivity was used, both the MD direction heat shrinkage rate and the TD direction heat shrinkage rate were significantly reduced, despite a relatively small application amount of the coating layer.

Through this, it was confirmed that high-temperature thermal resistance of a separator may be improved by coating the separator by using the cross-linking reactive polyacrylamide-based copolymer.

Hitherto embodiments have been described with reference to drawings and examples, but these are only illustrative, and those skilled in the art will be able to understand that various modifications and equivalent other embodiments are possible therefrom. Therefore, the scope of the present disclosure should be defined by the appended claims.

The invention claimed is:

1. A composition for coating a separator, the composition comprising:
    a binder including an aqueous cross-linking reactive polyacrylamide copolymer;
    inorganic particles; and
    water,
    wherein the polyacrylamide copolymer includes at least two cross-linking reactive groups that are cross-linkable with each other,
    wherein the cross-linking reactive groups include at least one first functional group selected from a carboxyl group, an amine group, and an isocyanate group; and at least one second functional group selected from a hydroxyl group, an epoxy group, and an oxazoline group, and
    wherein an equivalent ratio of the first functional group and the second functional group is in a range of about 30:70 to about 70:30.

2. The composition for coating a separator of claim 1, wherein the cross-linking reactive groups include a carboxyl group and a hydroxyl group.

3. The composition for coating a separator of claim 1, wherein the polyacrylamide copolymer is a polymer of a monomer mixture including a N-position substituted amide monomer, the N-position substituted amide monomer including (meth) acrylamide, N,N-dialkyl (meth) acrylamide, N,N-dimethyl (meth) acrylamide, N,N-diethyl (meth) acrylamide, N,N-dipropyl (meth) acrylamide, N,N-diisopropyl (meth) acrylamide, N,N-di(n-butyl) (meth) acrylamide, N,N-di(t-butyl) (meth) acrylamide, N-ethyl (meth) acrylamide, N-isopropyl (meth) acrylamide, N-butyl (meth) acrylamide, N-n-butyl (meth) acrylamide, N-methylol (meth) acrylamide, N-ethylol (meth) acrylamide, N-methylolpropane (meth) acrylamide, N-methoxymethyl (meth) acrylamide, N-methoxyethyl (meth) acrylamide, N-butoxymethyl (meth) acrylamide, or N-acryloylmorpholine.

4. The composition for coating a separator of claim 3, wherein a content of the N-position substituted amide monomer is in a range of about 30 mol % to about 90 mol %, based on a total moles of monomer components of the monomer mixture of the polyacrylamide copolymer.

5. The composition for coating a separator of claim 1, wherein the polyacrylamide copolymer is a copolymer of a monomer mixture that includes:
a N-position substituted amide monomer; and
an acrylic monomer, the acrylic monomer including a carboxyl group-containing monomer, a (meth) acrylic acid alkyl monomer, a hydroxyl group-containing monomer, an isocyanate group-containing monomer, an oxazoline group-containing monomer, a multifunctional (meth) acrylate monomer, an acid anhydride group-containing monomer, a sulfonic acid group-containing monomer, a phosphoric acid group-containing monomer, a succinimide monomer, a maleimide monomer, an itaconimide monomer, a cyano-containing monomer, a (meth) acrylic acid aminoalkyl monomer, a (meth) acrylic acid alkoxyalkyl monomer, an epoxy group-containing acrylic monomer, an acrylic acid ester monomer including a heterocycle, a halogen atom, or a silicon atom, acryloylmorpholine, a (meth) acrylic acid ester including an alicyclic hydrocarbon group, a (meth) acrylic acid ester including an aromatic hydrocarbon group, or a (meth) acrylic acid ester obtained from a terpene compound-derived alcohol.

6. The composition for coating a separator of claim 5, wherein a molar ratio of the N-position substituted amide monomer and the acrylic monomer is in a range of about 1:99 to about 99:1.

7. The composition for coating a separator of claim 1, wherein the polyacrylamide copolymer is an aqueous cross-linking reactive polyacrylamide-acrylic acid-hydroxyethyl acrylic copolymer.

8. The composition for coating a separator of claim 1, wherein a content of the polyacrylamide copolymer is about 10 wt % to about 100 wt %, with respect to a total weight of the binder.

9. The composition for coating a separator of claim 1, wherein the inorganic particles include boehmite, alumina, aluminum oxyhydroxide (AlOOH), zirconia, yttria, ceria, magnesia, titania, silica, aluminum carbide, titanium carbide, tungsten carbide, boron nitride, aluminum nitride, calcium carbonate, barium sulfate, aluminum hydroxide, or magnesium hydroxide.

10. The composition for coating a separator of claim 1, wherein a weight ratio of a total weight of the binder to a weight of the inorganic particles is about 0.1:99.9 to about 50:50.

11. The composition for coating a separator of claim 1, wherein the composition for coating a separator does not include a crosslinker.

12. A separator, comprising:
a porous substrate; and
a dried cross-linked product of the composition for coating a separator according to claim 1 on one surface or both surfaces of the porous substrate.

13. The separator of claim 12, wherein the coating layer includes:
a binder including the aqueous cross-linking reactive polyacrylamide copolymer; and
inorganic particles, wherein two or more cross-linking reactive groups included in the polyacrylamide copolymer have a mutually cross-linked form.

14. The separator of claim 12, wherein the separator has a basis weight ratio of less than 0.6 as calculated by Equation 1 below:

Basis weight ratio=unit weight of coating layer/unit weight of porous substrate.     <Equation 1>

15. The separator of claim 14, wherein the separator has a basis weight ratio of less than 0.45.

16. A lithium battery comprising the separator according to claim 12.

* * * * *